H. W. BROOMFIELD.
VEGETABLE CUTTER.
APPLICATION FILED MAY 4, 1917.
1,234,724.
Patented July 31, 1917.
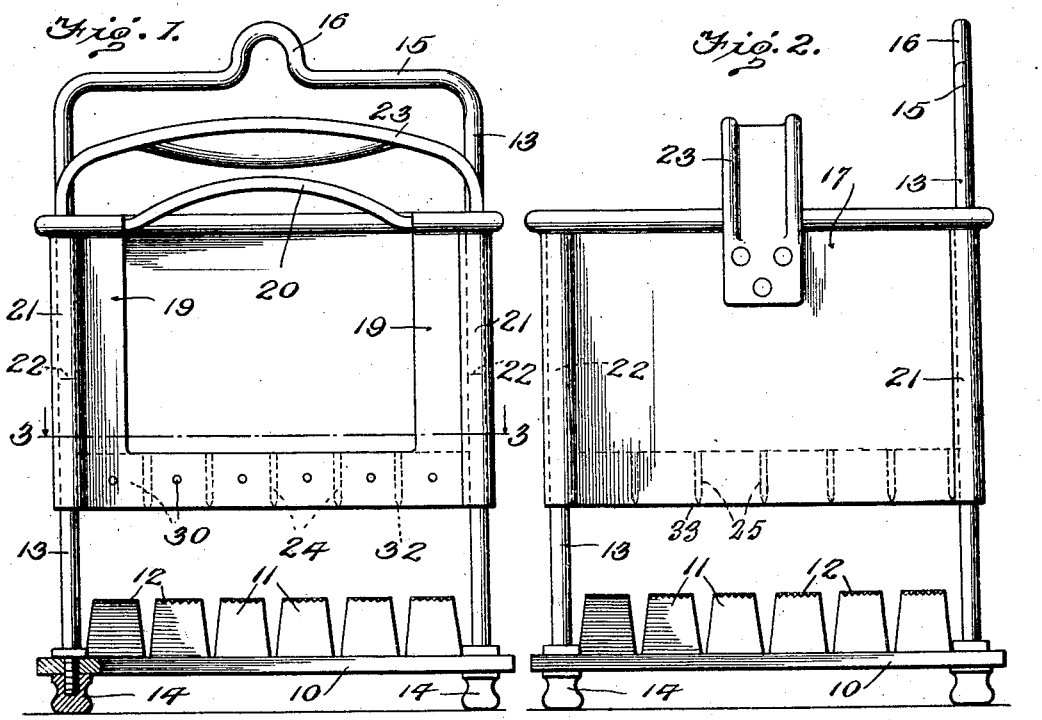
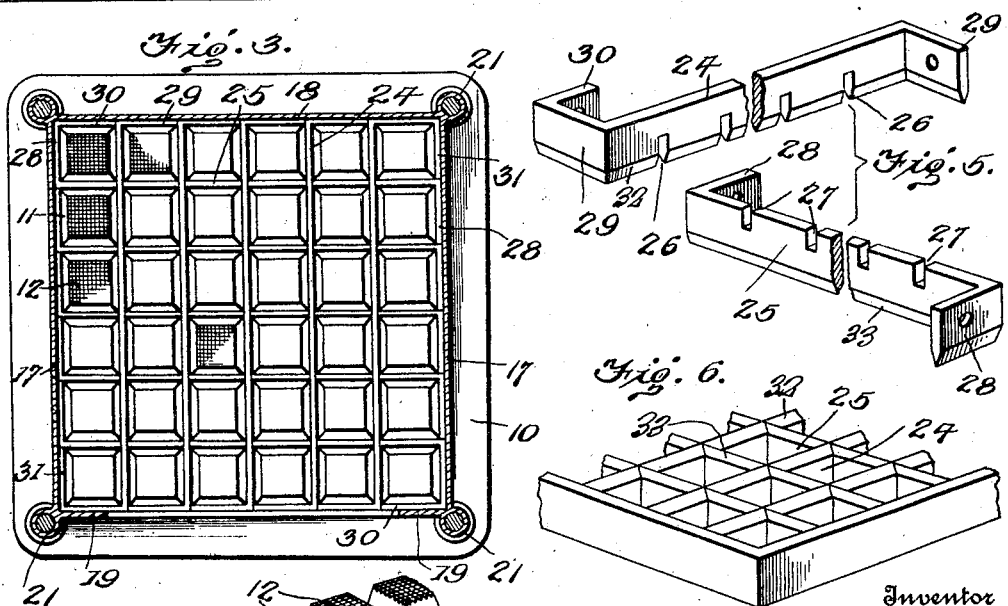
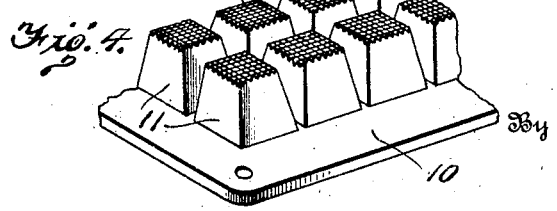
Inventor
H. W. Broomfield
By
Attorneys

UNITED STATES PATENT OFFICE.

HORACE W. BROOMFIELD, OF BOSTON, MASSACHUSETTS.

VEGETABLE-CUTTER.

1,234,724.   Specification of Letters Patent.   Patented July 31, 1917.

Application filed May 4, 1917. Serial No. 166,448.

*To all whom it may concern:*

Be it known that I, HORACE W. BROOMFIELD, a subject of the King of Great Britain, but have declared my intention of becoming a citizen of the United States, residing at Boston, in the county of Suffolk and State of Massachusetts, have invented certain new and useful Improvements in Vegetable-Cutters, of which the following is a specification.

This invention relates to devices for cutting vegetables into predetermined shapes, more particularly to devices for cutting potatoes into small cubes or forms preliminary to producing what is known as "French fried" potatoes, and has for one of its objects to improve the construction and increase the efficiency and utility of devices of this character.

Another object of the invention is to produce a device of this character which may be cheaply constructed and wherein the parts are easily separable for renewal or repairs.

In the drawings illustrative of the preferred embodiment of the invention:

Figure 1 is a front elevation of the improved device;

Fig. 2 is a side elevation of the device shown in Fig. 1;

Fig. 3 is a plan view in section on the line 3—3 of Fig. 1;

Fig. 4 is a perspective view of a portion of the base member employed in the structure disclosed in Figs. 1, 2 and 3;

Fig. 5 represents a pair of the combined cutting and dividing bars in perspective;

Fig. 6 is a perspective detail illustrating a modification in the construction.

The improved device comprises a supporting base member 10 with which a plurality of block shaped plungers 11 are associated, the plungers preferably tapering slightly toward their free ends and likewise preferably provided with transverse scores or channels 12 to form roughened faces to prevent the vegetables from slipping from side to side while being cut.

Arranged to coact with the plungers 11 are a plurality of blades or knives connected to a suitable support and so arranged that they form pockets or sockets to receive the plungers 11 when the supporting members of the blades are moved in one direction.

Rising from the supporting base 10 are a plurality of vertical standards 13 suitably connected at their lower ends in the support, the latter preferably having supporting feet 14 corresponding to the standards 13. Preferably the members 14 will serve as binding nuts to engage the threaded lower ends of the members 13, as shown at the left in Fig. 1, so that the base member 10 and the blocks 11 may be readily detached.

Any required number of the members 13 may be employed, but usually four will be used one at each corner as shown. The standard members 13 are arranged in pairs, and for the purpose of this description one pair of the standards will be referred to as the forward standards, and the other pair as the rearward standards. The rearward pair of the members 13 are extended at the upper end above the lines of the forward standards and united, as shown at 15, and a downwardly opening loop 16 formed in the transverse portion 15 to provide means for suspending the improved device from a nail or hook when not in use. The upwardly extended portion 15 of the rearward standards also serves as a holder with which one hand of the operator engages to hold the device steady while the shell and its cutters are being actuated by the other hand. Slidably disposed upon the members 13 is a shell or casing, preferably of sheet metal, and comprising side walls 17, a rear wall 18 and a front wall represented as a whole at 19, the latter having a relatively large central opening, as shown in Figs. 1 and 2. The shell or casing is open at the upper and lower sides and the upper edges reinforced and supported by a wire band 20 over which the edges of the casing are rolled, as shown. The portion of the binder member 20 which extends between the parts 19 is curved upwardly, as shown in Fig. 1, to increase the size of the front opening of the casing, to facilitate the discharge of the cut potatoes. At its corners the walls of the casing are formed into vertical guiding tubes 21, which slidably engage over the forward standard members 13. The members 13 terminate at 22 within the guide tubes 21 at the front of the shell. A suitable hand grip represented as a whole at 23, is connected to the side wall 17 of the casing to enable the latter to be manually operated.

The interior area of the shell or casing corresponds to the plunger devices 11, so that when the casing is disposed in its lower position the lower edge of the casing will bear flatly upon the upper face of the supporting base 10 with the plungers 11 entirely within the lower portion of the casing.

The combined cutting and dividing members are constructed as shown in Fig. 5, and arranged at right angles to each other as shown in Fig. 3, one set 24 of which extend transversely of the casing in one direction, while the other set 25 extend in the opposite direction. The members 24 are provided with downwardly opening slots 26, while the members 25 are provided with upwardly opening slots 27, the slots being disposed at uniform distances apart to enable the members 24—25 to be interengaged, and dividing the interior of the casing into a plurality of uniform sized pockets, corresponding in number to the plungers 11. At their ends the members 25 are bent at right angles, as shown at 28, to bear against the inner side walls 17 of the casing, and the members 24 are likewise bent at right angles at the ends, as shown at 29, to engage the inner faces of the rear wall 18 and the forward wall 19 below the opening therein, and secured in place by rivets or like fastening devices. One of the terminal portions 29 of the members 24 next to the rear wall 18 and the front wall 19 of the casing are extended in parallel relation to the walls 18—19 as shown at 30, to coact with the lateral extensions 29 of the members 24, while one of the terminal portions 29 of the members 25 next to the side walls 17 are extended, as shown at 31.

By this means the sizes of the corner pockets are the same as the remaining pockets.

The lower edges of the members 24—25 are knife edged as represented at 32—33, to enable them to readily sever the vegetables.

By this arrangement it will be obvious that when a slice of potato or other vegetable is disposed upon the upper channeled faces of the plunger members 11 and the casing together with its cutting members forced downwardly, the slice of the vegetable will be divided into a plurality of cubes corresponding in size to the spaces between the members 24—25, the plungers operating to eject the severed cubes into the space within the casing above the members 24—25. Each operation of the casing and its combined severing and cutting members disposes a set of the vegetable cubes within the casing, and they may be removed through the opening in the front wall 19, as required.

The combined cutting and separating members may be constructed integral, as illustrated in Fig. 6, or formed as shown in Figs. 3 and 5.

The foot members 14 being readily detachable the base member together with the plungers 11 may be readily detached for renewal or repairs, and likewise to enable the casing to be removed if required.

The base member together with the plungers 11 may be formed integral of block tin or like inexpensive material, or the members 10—11 may be constructed of hard wood. The metal parts may be galvanized, tinned or otherwise protected from corrosion.

The improved device may be constructed of any required size and of any required material, as it is not desired to limit the invention in any manner in this respect.

Having thus described the invention, what is claimed as new is:

1. In an apparatus of the class described, a supporting base, forward guiding standards rising from the base, rearward guiding standards rising from the base and connected at their upper ends, said rearward standards and their connecting portion extending above the line of the forward standards, a shell having guide sleeves movably engaging the guiding standards and provided with an opening in its forward wall, a hand grip member carried by the shell, a plurality of ejector devices supported upon said base, and a plurality of combined cutters and dividers within the shell and below the line of the opening thereof and coacting with the ejectors when the shell and the cutters carried thereby is depressed.

2. In an apparatus of the class described, a supporting base, forward guiding standards rising from the base, rearward guiding standards rising from the base and connected at their upper ends, said rearward standards and their connecting portion extending above the line of the forward standards, a shell having guide sleeves movably engaging the guiding standards and provided with an opening in its forward wall, a binder member engaging the upper edge of the shell and extending over the opening thereof, a hand grip member carried by the shell, a plurality of ejector devices supported upon said base, and a plurality of combined cutters and dividers within the shell and below the line of the opening thereof and coacting with the ejectors.

3. In an apparatus of the class described, a supporting base having apertures at its corners, forward standards and rearward standards engaging by their lower ends through said apertures, said rearward standards extending above the line of the forward standards and connected at their upper ends, combined holding devices and supporting feet engaging the standards below the base, a shell having guide sleeves movably engaging the guiding standards and provided with an opening in its forward wall, a hand grip member carried by the shell, a plurality of ejector devices supported upon said base, and a plurality of combined cutters and dividers within the shell and below the line of the opening thereof and coacting with the ejectors.

In testimony whereof I affix my signature.

HORACE W. BROOMFIELD. [L. S.]

Copies of this patent may be obtained for five cents each, by addressing the "Commissioner of Patents, Washington, D. C."